United States Patent [11] 3,559,664

| [72] | Inventors | Errol V. Seymour |
| | | Houston, Tex.; |
| | | DeLoss E. Winkler, Orinda, Calif. |
| [21] | Appl. No. | 671,221 |
| [22] | Filed | Sept. 28, 1967 |
| [45] | Patented | Feb. 2, 1971 |
| [73] | Assignee | Shell Oil Company |
| | | New York, N.Y. |
| | | a corporation of Delaware |

[54] PROCESS OF REDUCING FRICTION LOSS IN FLOWING HYDROCARBON LIQUIDS
3 Claims, No Drawings

| [52] | U.S. Cl. | 137/13, 252/8.55 |
| [51] | Int. Cl. | F17d 1/16 |
| [50] | Field of Search | 252/8.55A; 137/13; 166/308, (Inquired) |

[56] References Cited
UNITED STATES PATENTS

| 3,351,079 | 11/1967 | Gibson | 252/8.55X |
| 3,466,242 | 9/1969 | McClaflin et al. | 252/8.55 |

*Primary Examiner*—Leon D. Rosdol
*Assistant Examiner*—M. L. Halpern
*Attorneys*—George G. Pritzker and J. H. McCarthy ABSTRACT: A method of reducing friction during flow of hydrocarbon liquids through conduits by addition to the liquids of a small amount of a copolymer of ethylenepropylene.

This invention relates to a method of decreasing friction loss in flowing hydrocarbon liquids through conduits, generally over great distances but also over short distances such as in well fracturing processes. More particularly, the invention is directed to the addition of a novel class of ethylenepropylene copolymers to hydrocarbon liquids such as crude oil and fractions thereof, so as to reduce its friction loss due to flow through pipelines over great distances and short distances.

PROCESS OF REDUCING FRICTION LOSS IN FLOWING HYDROCARBON LIQUIDS

BACKGROUND OF THE INVENTION

It is well known in the art that friction resulting in the transportation of hydrocarbon liquids, ranging in viscosity from gasoline to crude oil, through pipelines under turbulent flow, contributes greatly to pumping costs due to increasing energy requirements necessary to overcome this phenomena as well as ultimate damage to the pipelines. Friction losses become apparent as a pressure drop in the pipeline as the hydrocarbon liquids are pumped through it.

To reduce friction and overcome the undesired effects mentioned above, various means have been tried such as coating of the pipe walls with friction reducing materials or by addition of friction reducing chemical agents to the transported liquids such as described in U.S. Pat. Nos. 2,492,173; 3,023,760; 3,102,548 and 3,215,154. However, these means of reducing friction have met with little success because of the high cost of either coating the pipe walls or that of the friction reducing chemical agents.

It is an object of the present invention to reduce friction during the flow of hydrocarbon liquids in conduits.

Still another object of the present invention is to provide a novel class of additives for use in hydrocarbon liquids flowing through pipelines which would cause a greater reduction in friction and hence a greater savings in pumping costs than do the materials mentioned in the above patents, namely polyisobutylene, polyacrylamide, etc.

Still another object of the invention is to provide a process for pumping hydrocarbon liquids through conduits wherein the pressure drop due to the liquid flow is greatly decreased and friction loss is also greatly decreased.

Other objects will be apparent from the following description.

SUMMARY OF THE INVENTION

The above and other objects are attained according to this invention by addition of a small amount, preferably from 10 to 2000 parts per million, to hydrocarbon liquids being transported through a conduit, of a copolymer of ethylenepropylene block constructed, and still more preferred is the microblock copolymer of ethylenepropylene having units of the configuration

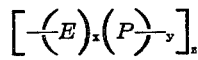

where $E$ is ethylene, $P$ is propylene and $x$ and $y$ are integers each being greater than 2 and $z$ being an integer such that the intrinsic viscosity of the block copolymer is at least 5 and preferably between 6 and 15. The percent of ethylene and propylene blocks in the molecule can vary over a wide range of from 10—90 percent to 90—10 percent.

The copolymers of ethylenepropylene can be partially hydrogenated.

The copolymers useful as friction reducers for hydrocarbon liquids flowing through conduits may be prepared by suitable means using inert solvents and appropriate catalysts such as Ziegler type catalysts. Two catalyst systems have been found particularly used useful in forming microblock copolymers. One such catalyst is based on the reaction of gamma-$TiCl_3$ and $R_2AlNR'_2$ where the latter is prepared by reacting in sequence $R'_2NH$, butyl Li and $R_2AlX$ where R is an alkyl radical, R' is an aryl radical and X can be a hydrocarbyl or oxyhydrocarbyl radical. The other catalyst is based on the reaction of gamma-$TiCl_3$, $AlR_2OR$, where R is preferably ethyl radical, and azulene.

The copolymerization is conducted in the presence of a hydrocarbon solvent which is essentially inert under the conditions of the polymerization. Alkanes and cycloalkanes such as hexane, cyclohexane, heptane or other saturated hydrocarbons having from 4—10 carbon atoms per molecule are preferred solvents for this purpose. Aromatic solvents, benzene, toluene, etc., also can be used as well as some chlorinated alkanes and cycloalkanes. These solvents may be modified by the additional presence of 0.5—10 percent by weight of a chlorocarbon such as carbon tetrachloride.

The polymerization should be conducted under conditions which will avoid inadvertant termination of the growing polymer chain. This temperature range is usually between about −25° C. and about 100° C., the preferred range being between about −15° and 75° C.

Examples of the preparation and properties of microblock copolymers of polyethylene and polypropylene are given in Table 1.

TABLE 1.—EXAMPLES OF PREPARATION AND PROPERTIES OF EPR

Conditions:
Solvent—Heptane
γ-$TiCl_3$—5 mmoles/l.
Al—15 mmoles/l.
Pressure—Atmospheric

| Polymer compound | Al alkyl | Temp., °C. | $C_2$, percent m. | IV.[c] |
|---|---|---|---|---|
| A | $Et_2AlN\phi*_2$ in situ preparation | 50 | 74 | 9.2 |
| B | do.[*] | 50 | 61 | 8.7 |
| C | do.[*] | 50 | 35 | 7.7 |
| D | $Et_2AlN\phi*_2$ in situ preparation plus $H_2$ | 50 | 51 | 4.2 |
| E | $(C_8)_2AlN\phi*_2$ in situ preparation | 50 | 63 | 9.5 |
| F | $Et_2AlN\phi*_2$ (recrystallized) | 50 | 60 | 9.9 |
| G | $Et_2AlN\phi*_2$ (recrystallized)[a] | 50 | 55 | 9.0 |
| H | $AlEt_3$ plus ethyl alcohol plus azulene | 25 | 61 | 6.7 |
| I | do.[b] | 25 | 54 | 3.7 |
| J | do | 0 | 60 | 10.7 |

[a] Al/Ti=1.
[b] 10% v. $H_2$ added to gas feed.
[c] IV.=Intrinsic viscosity in decalin at 150° C.
[d] Azulene/Ti=1/2.
[*] $\phi$=Phenyl radical.

Other block copolymers of the ethylene and propylene can be prepared by the methods described in U.S. Pat. Nos. 3,296,338; 3,301,921 and 3,318,976 as well as random copolymers of ethylene and propylene prepared by the methods as described in U.S. Pat Nos. 2,839,515; 2,691,647; 3,328,327 and Canadian Pat. 699,983 or by other suitable means. Mixtures of block and random copolymers of ethylene and propylene can be used.

To illustrate the effectiveness of the ethylenepropylene copolymers of the present invention in reducing friction in hydrocarbon liquids flowing through a conduit, crude oil and kerosene were circulated through a pipeline system and pressure differential was measured across a test section of the pipeline. The pressure drop across the test section when pumping crude oil or kerosene alone was compared with the pressure drop when pumping crude oil or kerosene containing the dissolved ethylene-propylene copolymer. The flow rate increase which occurred on addition of the copolymer was measured also.

The percentage friction reduction was defined as $$100(1 - \Delta p^{(p)}/\Delta p)$$

where $\Delta p$ was the pressure drop over the 4-foot long test section with only crude oil or kerosene flowing round the loop and $\Delta p^{(p)}$ was the pressure drop over the same length of pipe with polymer in the system. Both pressure drops were referred to the constant flow rate measured before copolymer addition.

The copolymer concentration was approximately 300 ppm by weight. The flow rate of the crude oil or kerosene was approximately 11 ft./sec. The temperature of the flowing fluid varied from room temperature to approximately 180°F.

The pressure drop reductions obtained by adding samples of ethylene-propylene copolymers to crude oil and kerosene flowing through a pipeline in turbulent flow are shown in Table 2.

TABLE 2.—PRESSURE DROP REDUCTIONS OBTAINED WITH SAMPLES OF ETHYLENE PROPYLENE COPOLYMERS

| Proportion of ethylene in micro-block copolymer (percent m.) | Intrinsic viscosity (dl./g.) | Friction reduction at 300 p.p.m. w. concentration (percent) |
| --- | --- | --- |
| 81 | 10.7 | 74 |
| 74 | 9.2 | 68 |
| 61 | 8.7 | 61 |
| 35 | 7.7 | 70 |
| 22 | 6.9 | 68 |

Polyisobutylene, the subject of U.S. Pat. No. 3,215,154, when tested under the same flow conditions and at the same concentration as for the copolymers listed in Table 2, gave friction reductions up to a maximum of 58 percent. This particular polyisobutylene had an intrinsic viscosity of 9.0. The superiority in friction reducing effectiveness of the ethylene-propylene copolymers which are the subject of this invention is seen by comparing the friction reduction percentages shown in Table 2 with the 58 percent maximum produced by polyisobutylene. Other oil soluble polymers tested for friction reducing performance gave smaller pressure drop reductions than polyisobutylene.

The foregoing description of the invention is merely intended to be explanatory thereof. Various changes in the details of the described method may be made, within the scope of the appended claims, without departing from the spirit of the invention.

We claim:

1. A method of reducing friction in a pipeline transporting a liquid hydrocarbon comprising injecting into or adding to a liquid hydrocarbon from about 10 to about 2000 ppm of a block copolymer of ethylene-polypropylene block having units of the configuration $$(E)_x(P)_{y_z}$$

where E is ethylene, P is propylene, $x$ and $y$ are integers being greater than 2 and $z$ is an integer such that the intrinsic viscosity of the block copolymer is between 5 and 15, when measured in decalin at 150° C.

2. The method of claim 1 wherein the block copolymer is a microblock copolymer of polyethylene and polypropylene having an intrinsic viscosity of from 6 to 15.

3. The method of claim 1 wherein the hydrocarbon fluid being transported through the pipeline is a crude oil and fraction thereof.